(12) United States Patent
Sato

(10) Patent No.: US 6,958,773 B1
(45) Date of Patent: Oct. 25, 2005

(54) WHITE BALANCE CONTROL AMOUNT CALCULATING DEVICE

(75) Inventor: Koichi Sato, Saitama (JP)

(73) Assignee: PENTAX Corporation, Tokyo (JP)

(*) Notice: Subject to any disclaimer, the term of this patent is extended or adjusted under 35 U.S.C. 154(b) by 631 days.

(21) Appl. No.: 09/617,100

(22) Filed: Jul. 14, 2000

(30) Foreign Application Priority Data

Jul. 15, 1999 (JP) .................. P11-201136

(51) Int. Cl.$^7$ .............................................. H04N 9/73
(52) U.S. Cl. .................................................. 348/223.1
(58) Field of Search .................... 348/223.1, 224.1, 348/275.1

(56) References Cited

U.S. PATENT DOCUMENTS

| | | | |
|---|---|---|---|
| 4,915,498 A * | 4/1990 | Malek | ...................... 356/5.04 |
| 4,951,134 A | 8/1990 | Nakasima et al. | |
| 5,402,182 A * | 3/1995 | Sugiura | ...................... 348/655 |
| 5,550,587 A * | 8/1996 | Miyadera | ................. 348/223.1 |
| 5,555,022 A * | 9/1996 | Haruki et al. | ............ 348/223.1 |
| 5,760,831 A * | 6/1998 | Tanaka et al. | ........... 348/223.1 |
| 5,808,681 A * | 9/1998 | Kitajima | ..................... 348/371 |
| 5,864,361 A | 1/1999 | Sekiya et al. | |
| 5,929,899 A | 7/1999 | Takahashi et al. | |
| 5,983,038 A | 11/1999 | Sato et al. | |
| 6,057,909 A * | 5/2000 | Yahav et al. | ................ 356/5.04 |
| 6,072,526 A * | 6/2000 | Hashimoto et al. | ....... 348/223.1 |
| 6,094,220 A * | 7/2000 | Nakano et al. | .......... 348/223.1 |
| 6,094,539 A | 7/2000 | Abe | |
| 6,545,710 B1 * | 4/2003 | Kubo et al. | ............... 348/223.1 |

FOREIGN PATENT DOCUMENTS

| | | | | |
|---|---|---|---|---|
| JP | 04351074 | * | 12/1992 | .......... H04N 5/232 |
| JP | 10079882 A | * | 3/1998 | .......... H04N 5/232 |
| JP | 2000069488 A | * | 3/2000 | ............ H04N 9/04 |
| JP | 2001136546 A | * | 5/2001 | ............ H04N 9/73 |

* cited by examiner

*Primary Examiner*—James J. Groody
*Assistant Examiner*—Brian Genco
(74) *Attorney, Agent, or Firm*—Greenblum & Bernstein, P.L.C.

(57) ABSTRACT

A white balance control amount calculating device, provided in an electronic still camera, comprises an imaging device by which an image signal of a subject is sensed. Based on the image signal, a single image is divided into three image areas, for example. The first image area contains a first subject which is located at a short distance from the electronic still camera. The second image area contains a second subject which is located at infinity. The third image area contains a third subject which is located at a distance between the first and second subjects. An image area, in which a subject image is in-focus, is extracted from the three image areas. A control amount for a white balance adjustment is obtained based on image data corresponding to the extracted image area.

7 Claims, 11 Drawing Sheets

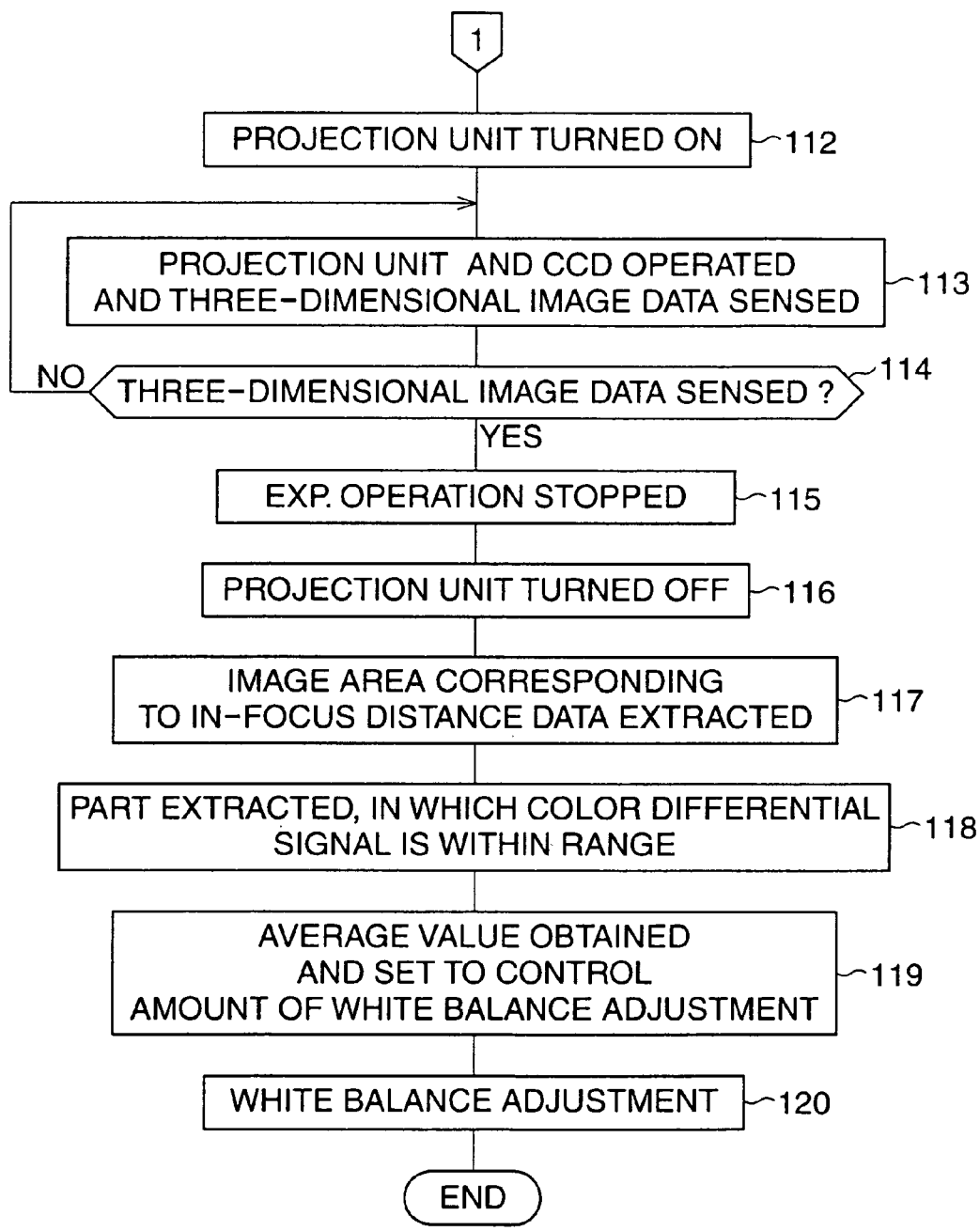

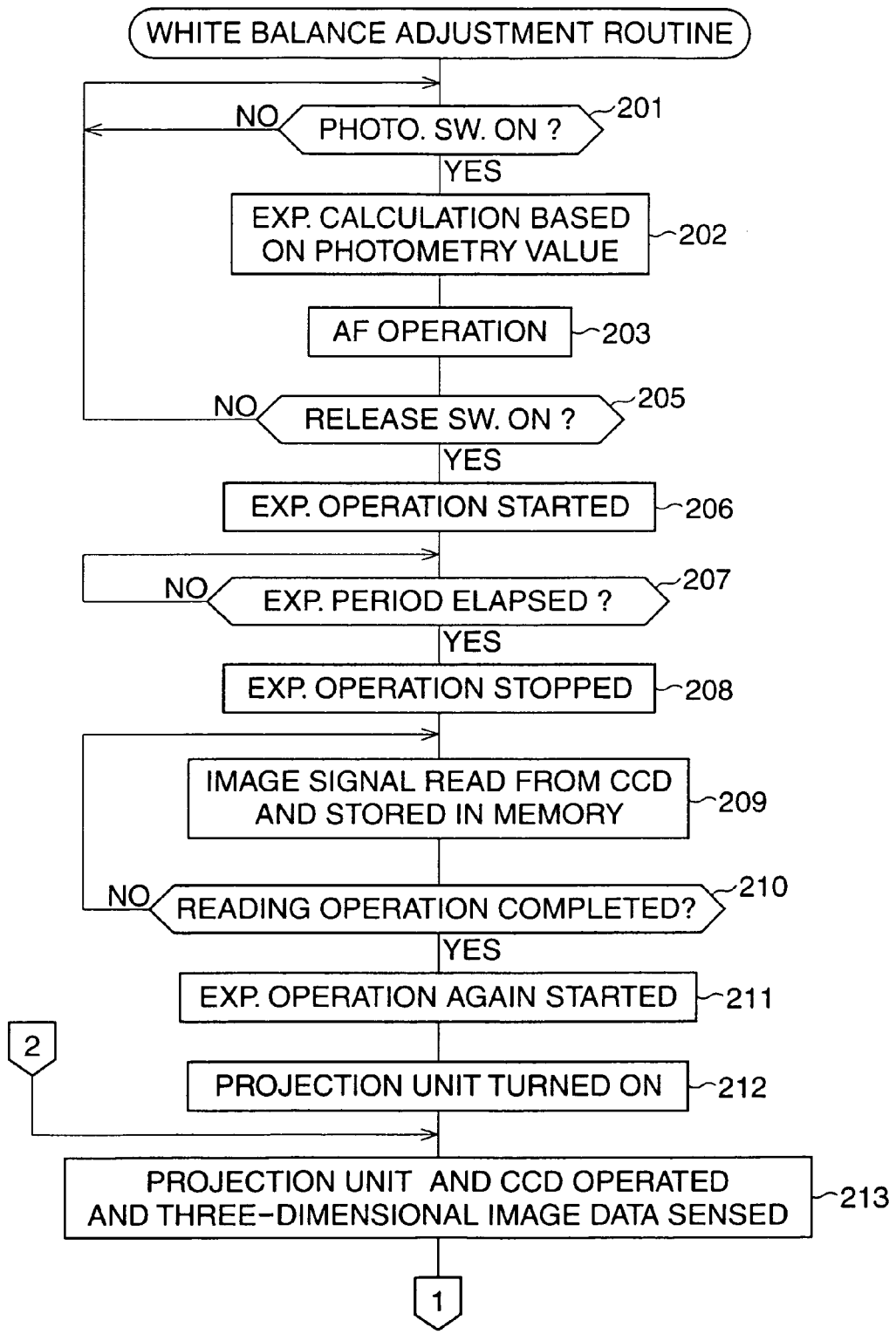

WHITE BALANCE CONTROL AMOUNT CALCULATING DEVICE

BACKGROUND OF THE INVENTION

1. Field of the Invention

The present invention relates to an electronic still camera by which an image signal obtained by an imaging device is recorded, and especially, to a device which calculates a white balance control amount for adjusting a color of a color image obtained based on the image signal.

2. Description of the Related Art

Conventionally, for calculating a white balance control amount, there is known a device in which only pixel signals of achromatic color are extracted from all of the pixel signals forming a single image, and the white balance control amount is calculated based on the pixel signals of achromatic color. Namely, in the pixel signals of the achromatic color, pixels other than the subject image, which the photographer intends to photograph, are contained. On the other hand, there is known another device, in which a white balance control amount is calculated using all of the pixel signals forming the single image. In the latter device, similarly to the former device, pixels other than the subject image, which the photographer intends to photograph, are contained.

When a tint of an image portion of the subject to be photographed and that of an image portion other than the subject are close to each other, the white balance control amount would be proper even though pixel signals included the portion other than the subject. Conversely, when tint is drastically locally varied in the image, the white balance adjustment may not be performed properly for the subject to be photographed.

SUMMARY OF THE INVENTION

Therefore, an object of the present invention is to provide a white balance control amount calculating device by which a white balance adjustment can be always properly performed regardless of the tint of the image as a whole.

According to the present invention, there is provided a white balance control amount calculating device comprising an image signal generating processor, an image area extracting processor and a control amount calculating processor.

The image signal generating processor generates an image signal corresponding to a first image formed on a light receiving surface of an imaging device. The image area extracting processor extracts at least one image area, which contains a second image of a subject positioned at a predetermined distance from an electronic still camera, from the first image. The control amount calculating processor calculates a control amount for performing a white balance adjustment, based on the image signal relating to the at least one image area.

Further, according to the present invention, there is provided a device for calculating a white balance control amount for an electronic still camera which photographs an image containing at least one subject and at least one portion other than the subject, the white balance control amount calculating device comprising an imaging device, an image area extracting processor and a control amount calculating processor.

The imaging device generates an image signal corresponding to the image. The image area extracting processor extracts at least one image area, each containing one of the aforementioned at least one subject, from the image. The control amount calculating processor calculates a control amount for performing a white balance adjustment, based on the image signal relating to the image area.

BRIEF DESCRIPTION OF THE DRAWINGS

The objects and advantages of the present invention will be better understood from the following description, with reference to the accompanying drawings in which:

FIGS. 10A and 10B show a flowchart of a white balance adjustment routine of the first embodiment;

FIGS. 11A and 11B show a flowchart of a white balance adjustment routine of a second embodiment.

DESCRIPTION OF THE PREFERRED EMBODIMENTS

Figure 1:
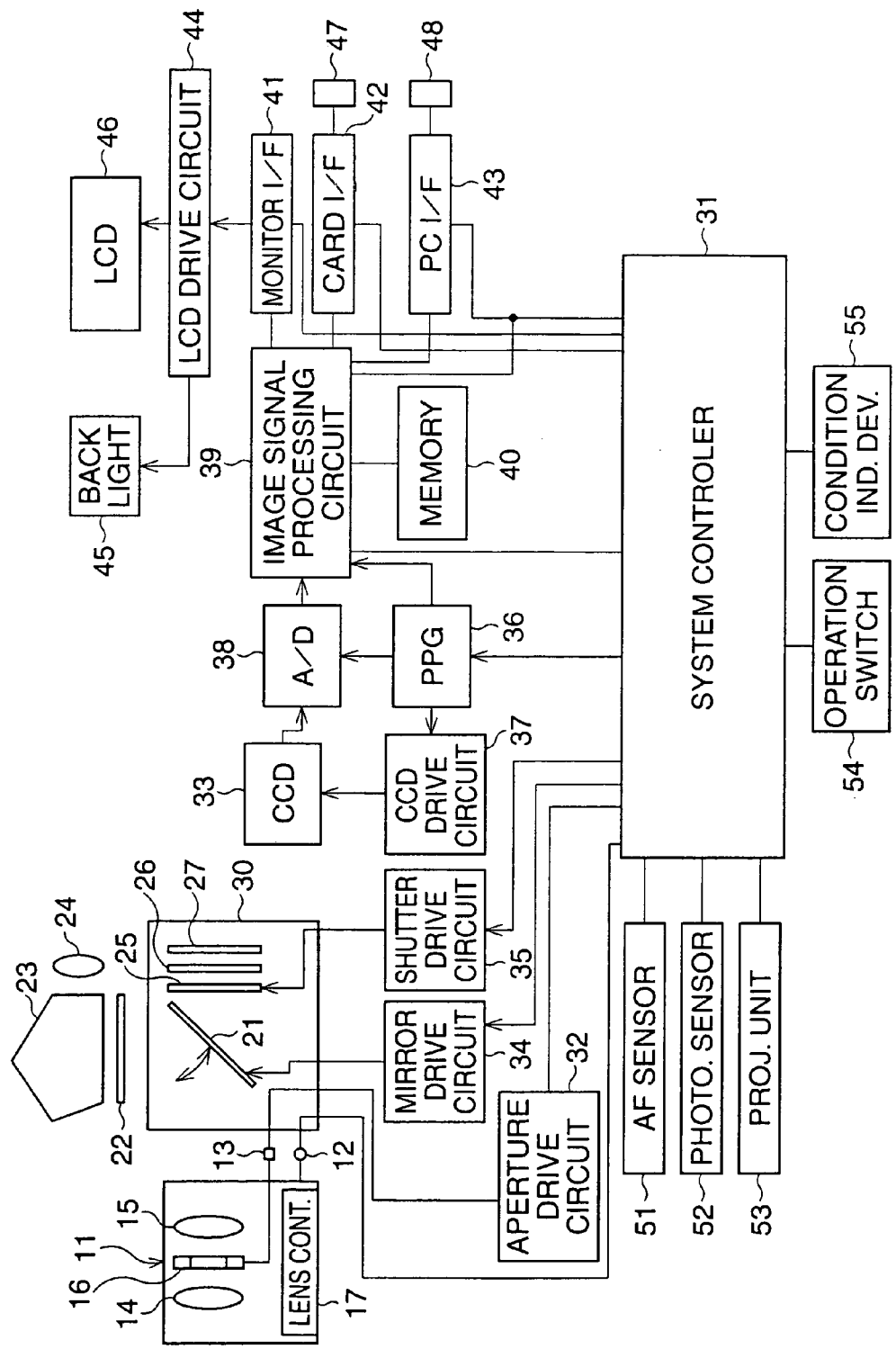
FIG. 1 is a block diagram showing an electronic still camera provided with a white balance control amount calculating device of a first embodiment of the present invention.

The present invention will be described below with reference to the embodiment shown in the drawings.

FIG. 1 is a block diagram of an electronic still camera with a white balance control amount calculating device of a first embodiment of the present invention.

The electronic still camera is a single-lens reflex camera, and an interchangeable lens 11 is electrically connected to an electric circuit provided in the camera body through mount pins 12 and 13. A front lens group 14 and a rear lens group 15 are mounted in a lens barrel of the interchangeable lens 11, and an aperture 16 is provided between the lens groups 14 and 15. Each of the lens groups 14 and 15 is displaced in the optical axis direction under control of a lens control circuit 17, so that a focusing adjustment is carried out. The lens control circuit 17 is operated in accordance with a control signal transmitted through the mount pin 12 from a system controller 31 provided in the camera body. The aperture 16 is operated in accordance with a control signal transmitted through the mount pin 13 from an aperture drive circuit 32 provided in the camera body, so that the opening degree of the aperture 16 is adjusted. The aperture drive circuit 32 is controlled by the system controller 31.

In the camera body, a quick return mirror 21 is disposed on the optical axis of the lens groups 14 and 15. The quick return mirror 21 is rotatable between an inclined state shown in the drawing and a horizontal state in which the quick return mirror 21 is rotated upward. A focusing glass 22 is provided above the quick return mirror 21, and a pentagonal prism 23 is arranged above the focusing glass 22. An eyepiece lens 24 of a view-finder is disposed behind the pentagonal prism 23.

A shutter 25 is provided behind the quick return mirror 21, and an infrared cut filter 26 and an optical low-pass filter 27 are arranged behind the shutter 25. A CCD (i.e., an imaging device) is provided behind the optical low-pass filter 27. Namely, the quick return mirror 21, the shutter 25, the infrared cut filter 26 and the CCD 33 are aligned on the optical axis of the lens groups 14 and 15.

A rotating operation of the quick return mirror 21 is driven by a mirror drive circuit 34, and an open-close operation of the shutter 25 is driven by a shutter drive circuit 35. The mirror drive circuit 34 and the shutter drive circuit 35 are controlled by the system controller 31.

Usually, the mirror 21 is set to an inclined state, so that light passing through the interchangeable lens 11 is led to the pentagonal prism 23. In this state, the shutter 25 is closed, so that an optical path to the CCD 33 is shut or closed. Conversely, when a photographing operation is carried out, the mirror 21 is upwardly rotated under control of the mirror drive circuit 34, and is set to the horizontal state. With the rotation of the mirror 21, the shutter 25 opens under control of the shutter drive circuit 35, so that light passing through the interchangeable lens 11 is radiated on a light receiving surface of the CCD 33. Namely, an image obtained through the lens groups 14 and 15 is formed on the light receiving surface, and thus an image signal corresponding to the image is generated in the CCD 33.

A pulse signal generator (PPG) 36 is connected to the system controller 31, so that the pulse signal generator 36 generates various kinds of pulse signals under control of the system controller 31. Based on these pulse signals, the CCD drive circuit 37, an A/D converter 38 and an image signal processing circuit 39 are driven, and an operation of the CCD 33 is controlled by the CCD drive circuit 37. Namely, the image signal read from the CCD 33 is converted to a digital image data by the A/D converter 38, and is then subjected to a predetermined process by the image signal processing circuit 39. A memory 40, having a capacity to store a few frame amounts of digital image data, is connected to the image signal processing circuit 39.

A monitor interface 41, a card interface 42 and a PC interface 43 are connected to the image signal processing circuit 39. These interfaces 41, 42 and 43 are controlled by the system controller 31. A back light 45 and a liquid crystal display (LCD) 46 are connected to the monitor interface 41 through a liquid crystal display drive circuit 44. Based on the image data read from the memory 40, the liquid crystal display drive circuit 44 is controlled, so that an image is indicated by the liquid crystal display 46. A card connector 47 is connected to the card interface 42, and a PC connector 48 is connected to the PC interface 43. An IC memory card can be mounted to the card connector 47, and a personal computer can be connected to the PC connector 48.

An AF sensor 51, a photometry sensor 52 and a projection unit 53 are connected to the system controller 31. The AF sensor 51 has a known construction, by which a photometry is performed so that an opening degree of the aperture 16 and an electric charge accumulation period (i.e., a shutter speed) of the CCD 33 are determined. The projection unit 53 is provided for radiating a distance measuring light beam to sense a distance from the electronic still camera to each point on the surface of the subject.

An operation switch 54 and a condition indicating device 55 are connected to the system controller 31. The operation switch 54 is provided with a switch such as a photometry switch and a release switch. The photometry switch is turned ON by partly depressing the release button, so that a photometry is carried out by the photometry sensor 52. The release switch is turned ON by fully depressing the release button, so that the shutter 25 is open and closed. Namely, the CCD 33 is exposed, and thus an image signal corresponding to an image is generated in the CCD 33. The condition indicating device 55 is provided with a liquid crystal display, by which various setting conditions of the electronic still camera are indicated.

Figure 2:
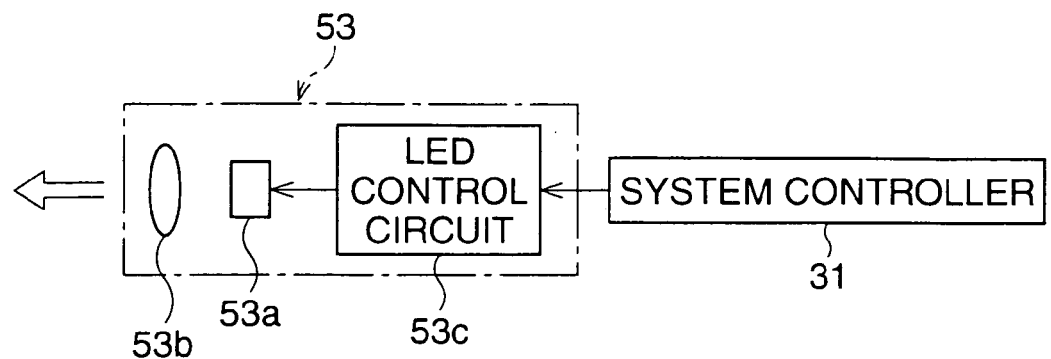
FIG. 2 is a block diagram showing a construction of a light beam projection unit.

FIG. 2 is a block diagram showing a construction of the projection unit 53.

The projection unit 53 is provided with a light emitting diode 53a radiating an infrared laser beam and a projection lens 53b provided in front of the light emitting diode 53a. A light emitting operation of the light emitting diode 53a is controlled by a light emitting diode control circuit 53c, which is operated based on a command signal output by the system controller 31.

Figure 3:
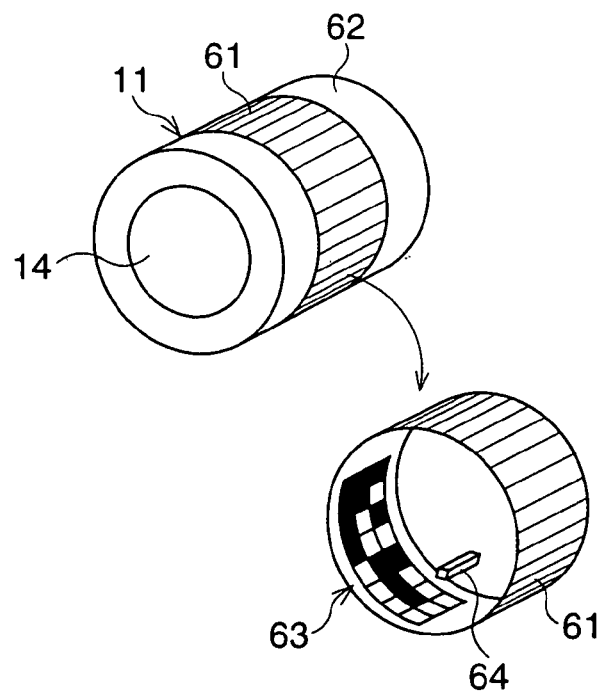
FIG. 3 is a perspective view showing an interchangeable lens and a focusing ring mounted in the interchangeable lens, in which the interchangeable lens and the focusing ring are disassembled.

FIG. 3 is a view showing an external appearance of the interchangeable lens 11 and a focusing ring 61 attached to the interchangeable lens 11, the focusing ring 61 being disassembled from the interchangeable lens 11 in the drawing. The focusing ring 61 is rotatably provided on an outer surface of the lens barrel 62 of the interchangeable lens 11. The focusing ring 61 is connected to a lens moving mechanism, which is mounted in the lens barrel 62 and is provided with a cam ring and the other components. By rotating the focusing ring 61, the lens groups 14 and 15 are moved in the optical axis direction so that a focusing adjustment is performed.

A two-dimensional bar code 63, indicating a distance from the camera to the subject, is provided on an inner surface of the focusing ring 61. A lens support cylinder (not shown), in which the lens groups 14 and 15 are housed, is disposed in the lens barrel 62. The lens support cylinder is fixed to the lens barrel 62, and a photo sensor 64 is attached on an outer surface of the lens support cylinder. The photo sensor 64 has a light emitting diode and a light receiving diode, and faces the two-dimensional bar code 63.

A light beam radiated from the light emitting diode is reflected on the two-dimensional bar code 63, and is received by the light receiving diode. The photo sensor 64 is connected to the lens control circuit 17 (FIG. 1), so that a signal, generated in the light receiving diode in accordance with received light, is input to the lens control circuit 17, and is then input to the system controller 31 provided in the camera body as a distance signal indicating a distance from the electronic still camera to the subject. Namely, the light radiated by the light emitting diode and reflected by the two-dimensional bar code is sensed by the light receiving diode, the distance from the electronic still camera to the subject is measured.

Figure 4:
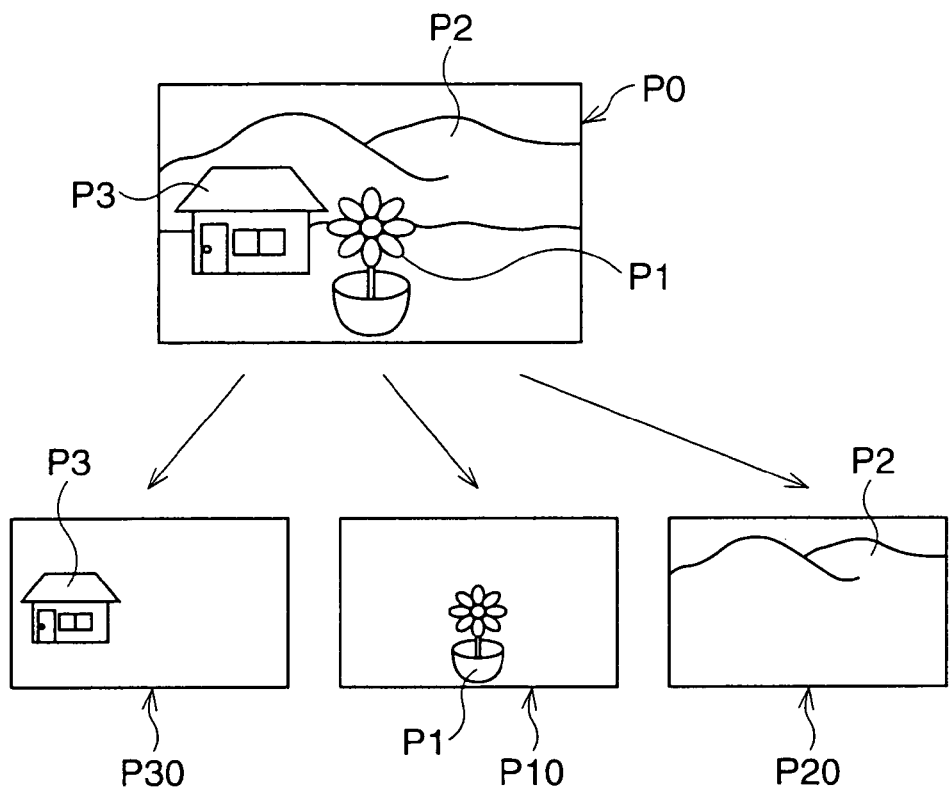
FIG. 4 is a view showing an example of an image observed through a view-finder.

FIG. 4 shows an example of an image P0 observed through the view-finder. The image P0 contains a subject P1 positioned close to the electronic still camera, a subject P2 positioned far from the electronic still camera, and a subject P3 positioned between the subjects P1 and P2. In this embodiment, as described later, only an image area containing the subject which is in-focus is extracted from the image, and a white balance adjustment is carried out based on an image signal regarding the image area. The image area is obtained by an operation in which, while the lens groups 14 and 15 focus on one of the subjects, distances from the camera to the subjects P1, P2 and P3 are measured and an image area corresponding to the distance signal obtained through the photo sensor 64 is detected.

Figure 5:
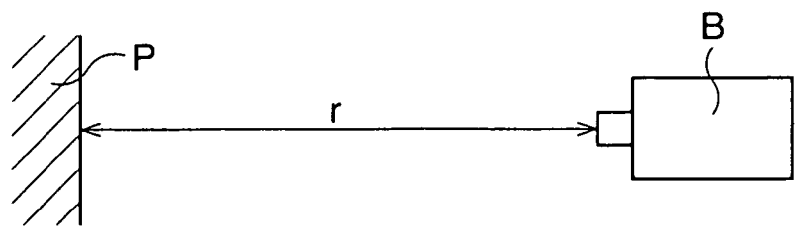
FIG. 5 is a view showing a principle behind a distance measurement.
Figure 6:
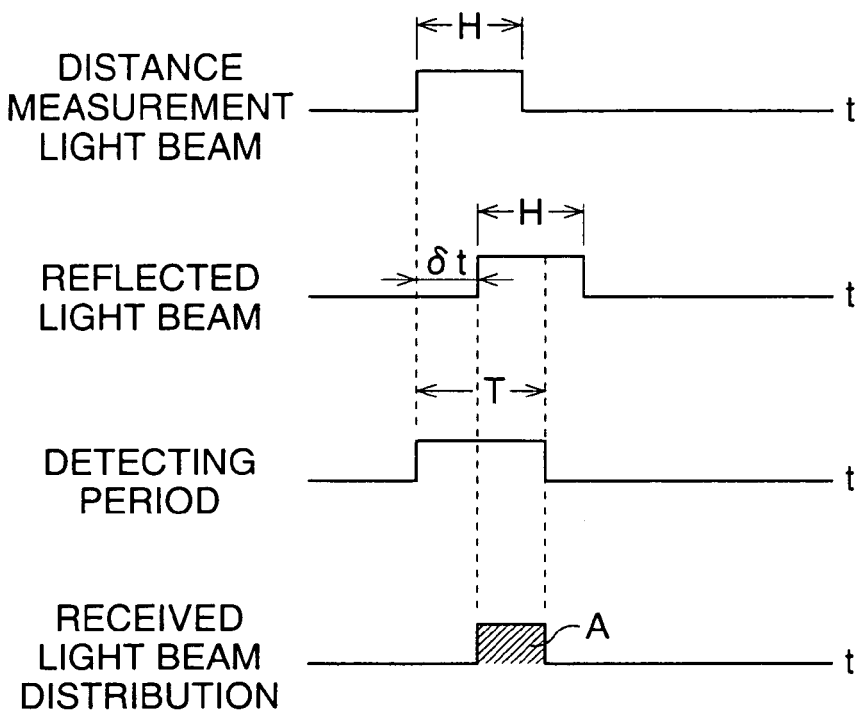
FIG. 6 is a timing chart showing a distance measurement light beam, a reflected light beam, a gate pulse and a distribution of an amount of a light beam received by a CCD.

With reference to FIGS. 5 and 6, a principle behind a distance measurement in the embodiment is described below. Note, in FIG. 6, the abscissa indicates time "t".

A distance measuring light beam output by a distance measurement device B (corresponding to the projection unit 53 shown in FIG. 1) is reflected by a measurement subject P, and the reflected light beam is sensed by the CCD 33 (FIG. 1). The distance measuring light beam is a pulse, a width of which is "H". Accordingly, the reflected light beam is a pulse, a width of which is "H", similarly to the distance measuring light beam. Therefore, a rise of the pulse of the reflected light beam occurs after a rise of the pulse of the distance measuring light beam by a time δ·t (δ is a delay coefficient). Since the distance measuring light beam and the reflected light beam have both traveled a distance "r" between the distance measurement device B and the measurement subject P, the distance "r" is represented as follows:

$$r = \delta \cdot t \cdot C/2 \qquad (1)$$

wherein "C" is the velocity of light.

For example, by setting a condition in such a manner that the reflected light beam can only be sensed from a rise of the pulse of the distance measuring light beam to a point prior to a fall of the pulse of the reflected light beam, i.e., by providing a gate pulse corresponding to a reflected light beam detecting period T, an amount "A" of received light from the reflected light beam becomes a function of the distance "r". Namely, the greater the distance "r" (or the greater the time δ·t), the less the received light amount A.

In the embodiment, by taking advantage of the principle described above, the received light amount A is sensed using each of the photo-diodes (photoelectric conversion elements) of the CCD 28, the distance from the electronic still camera to each point on the surface of the measurement subject P is sensed, and data of the three-dimensional image, which indicates a topography of the measurement subject P, can be obtained concurrently.

Figure 7:
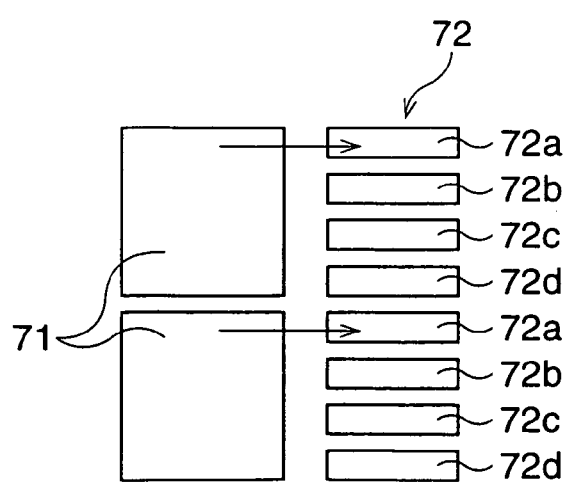
FIG. 7 is a plan view showing a disposition of photodiodes and a vertical transfer unit, which are provided in the CCD.
Figure 8:
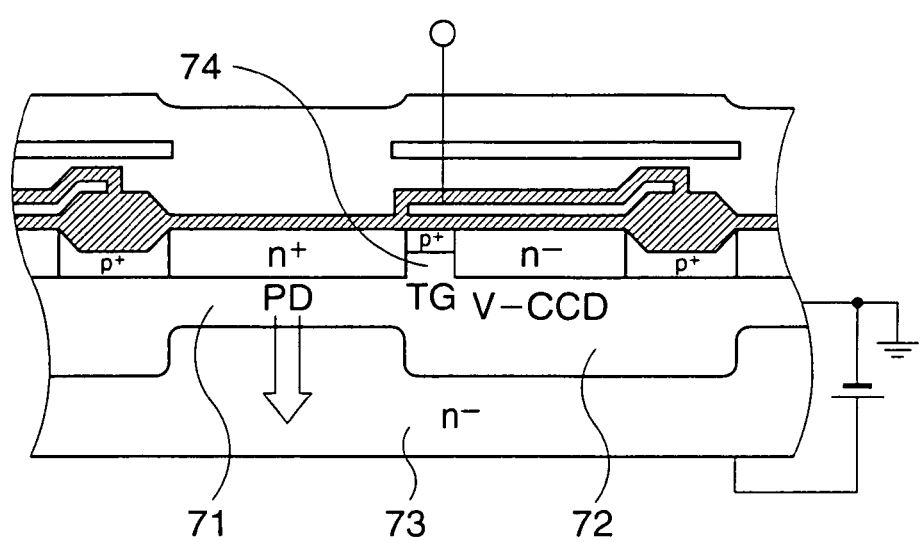
FIG. 8 is a sectioned elevational view of the CCD.

FIG. 7 is a plan view showing a disposition of the photo-diodes 71 and a vertical transfer unit 72, which are provided in the CCD 33. Actually, a multitude of photo-diodes 71 are arranged in a matrix, and a corresponding vertical transfer unit 72 is disposed beside each vertical column of photo-diodes 71. FIG. 8 is a sectioned elevational view of the CCD 33 in which the CCD 33 is cut in a plane perpendicular to a substrate 73. The CCD 33 is an interline CCD of vertical overflow drain (VOD) type, in which unwanted charge is discharged to the substrate 73.

The photo-diodes 71 and the vertical transfer unit (signal charge holding unit) 72 are formed along a surface of the n-type substrate 73. A plurality of the photo-diodes 71 are two-dimensionally disposed in a matrix arrangement, and the vertical transfer unit 72 is disposed adjacent to the photo-diodes 71, parallel to rows extending in a vertical direction in FIG. 7. The vertical transfer unit 72 has four vertical transfer electrodes 72a, 72b, 72c and 72d, which correspond to each of the photo-diodes 71. Therefore, in the vertical transfer unit 72, four potential wells can be formed, so that a signal charge is output from the CCD 33 by controlling a depth of the wells, as is well-known. Note that a number of the vertical transfer electrodes can be changed, depending upon a requirement of the CCD 33.

The photo-diodes (PD) 71 and the vertical transfer unit (V-CCD, being a signal charge holding unit) 72 are disposed in a p-type well formed on a surface of the substrate 73. The p-type well is completely depleted due to an inverse-bias voltage applied between the p-type well and the n-type substrate 73. In this state, electric charge is accumulated in the photo-diodes 71, and an amount of the electric charge corresponds to an amount of an incident light beam, which is the reflected light beam reflected by the measurement subject. When a substrate voltage is changed to a value greater than a predetermined value, electric charge accumulated in the photo-diodes 71 is discharged to the substrate 73. Conversely, when an electric charge transfer signal, which is a voltage signal, is applied to a transfer gate (TG) 74, the electric charge accumulated in the photo-diodes 71 is transferred to the vertical transfer unit 72. Namely, after the electric charge is discharged to the substrate 73 by the electric charge discharging signal, the signal charge accumulated in the photo-diodes 71 is transferred to the vertical transfer unit 52 by the electric charge transfer signal. By repeating the discharge and the transfer, an electronic shuttering operation is performed.

Figure 9:
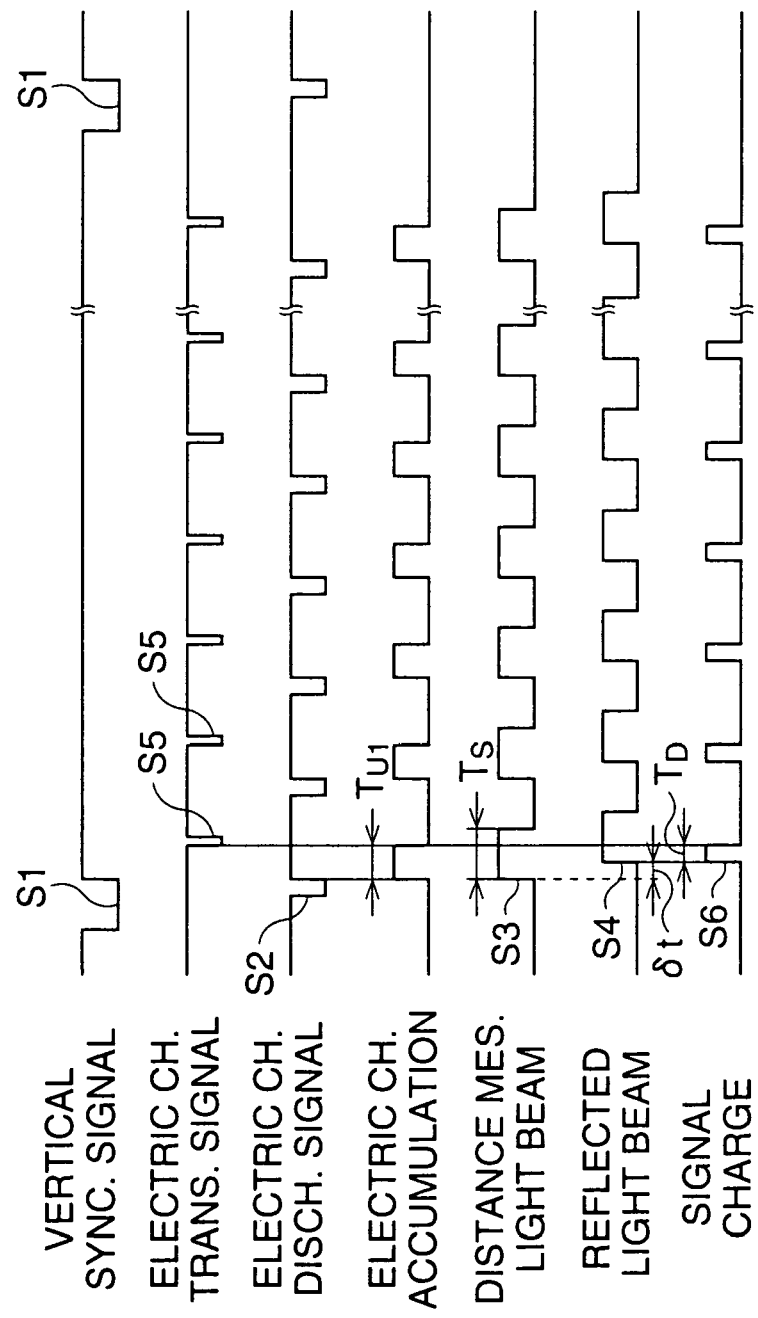
FIG. 9 is timing chart of a distance information sensing operation by which data, corresponding to a distance from an electronic still camera to each point on a surface of the measurement subject, is sensed.

FIG. 9 is a timing chart of a distance information sensing operation by which data, corresponding to the distance from the electronic still camera to each point on a surface of the measurement subject, is sensed. The distance information sensing operation is described below with reference to FIGS. 1, 7 through 9.

In synchronization with an output of a vertical synchronizing signal S1, an electric charge discharging signal (a pulse signal of negative polarity) S2 is output, so that unwanted charge, which is accumulated in the photo-diodes 71, is discharged to the substrate 73. Approximately simultaneously with a completion of the output of the electric charge discharging signal S2, the projection unit 53 is actuated, and thus a distance measuring light beam S3, which is a pulsed beam having a constant pulse-width, is output therefrom. The distance measuring light beam S3 is reflected by the measurement subject, and enters the CCD 33 as a reflected light beam S4. When a predetermined time has elapsed since the output of the distance measuring light beam S3, an electric charge transfer signal (a pulse signal of negative polarity) S5 is output, so that an electric charge accumulated in the photo-diodes 71 is transferred to the vertical transfer unit 72. Note that the electric charge transfer signal S5 is output before the output of a pulse of the distance measuring light beam S3 is completed.

Thus, for a period $T_{U1}$ from the end of the output of the electric charge discharging signal S2 to the beginning of the output of the electric charge transfer signal S5, signal charge corresponding to distances from the electronic still camera to the measurement subject is accumulated in the photo-diodes 71. Namely, although a period $T_s$, which is from the fall of the pulse of the distance measuring light beam S3 to the rise thereof, and the electric charge accumulation period $T_{u1}$ begin approximately simultaneously, the electric charge accumulation period $T_{u1}$ ends prior to a completion of the period $T_s$, so that only a part of the reflected light beam S4 is detected by the CCD 33. Signal charge S6, generated due to the detected light beam, corresponds to the distance from the electronic still camera to the measurement subject. In other words, the signal charge S6, corresponding to a light beam, which is included in the reflected light beam S4 coming from the measurement subject and which reaches the photo-diodes 71 within the electric charge accumulation period $T_{u1}$, is accumulated in the photo-diodes 71. The signal charge S6 is transferred to the vertical transfer unit 72 by the electric charge transfer signal S5. Note that the period $T_s$, for which the distance measuring light beam S3 is output, can begin prior to the electric charge accumulation period $T_{u1}$, if necessary.

After a predetermined time has elapsed since the output of the electric charge transfer signal S5, the electric charge discharging signal S2 is again output, so that unwanted charge, which is accumulated in the photo-diodes 71 after the transfer of the signal charge S6 to the vertical transfer unit 72, is discharged to the substrate 73. Thus, further signal charge is accumulated in the photo-diodes 71. Then, similarly to the above description, when the electric charge accumulation period $T_{u1}$ has again elapsed, the signal charge S6 is transferred to the vertical transfer unit 72.

The transferring operation of the signal charge S6 to the vertical transfer unit 72 is repeatedly performed until the next vertical synchronizing signal S1 is output. Thus, the signal charge S6 is integrated in the vertical transfer unit 72. The signal charge S6 integrated for one field period, which is between two vertical synchronizing signals S1, corresponds to distance information of the measurement subject, on condition that the measurement subject is stationary for the period between the two vertical synchronizing signals S1.

The detecting operation of the signal charge S6 described above is carried out in all of the photo-diodes 71 provided in the CCD 33. As a result of the detecting operation for one field period, the distance information sensed by the photo-diodes 71 is held in each corresponding vertical transfer unit 72, which is located adjacent to each column of photo-diodes 71. The distance information is output from the CCD 33 by a vertical transferring operation of the vertical transfer units 72 and a horizontal transferring operation of a horizontal transfer unit (not shown). The distance information is then converted to digital data by the A/D convertor 38, and is stored in the memory 40 through the image signal processing circuit 39.

Figure 10A:
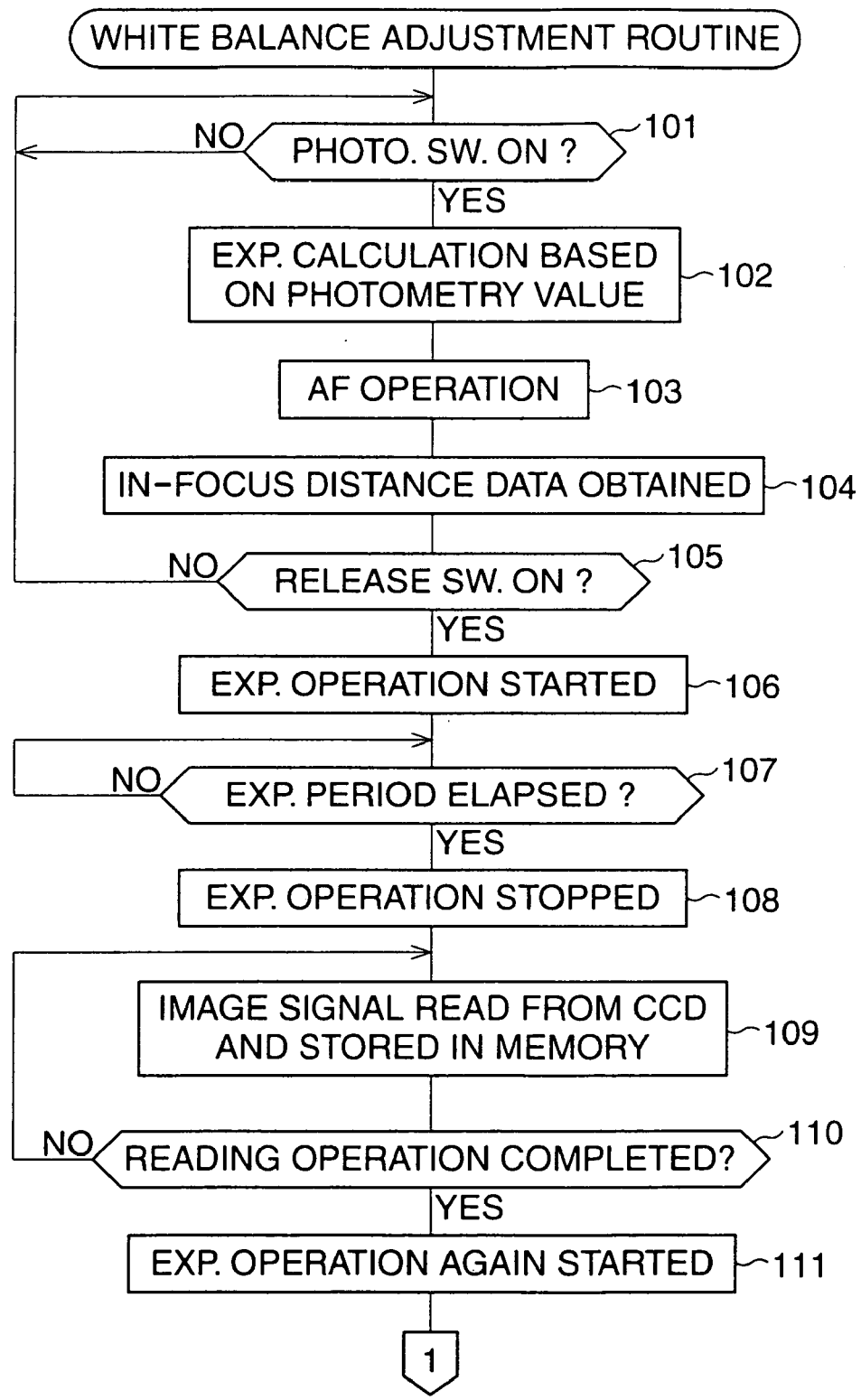

FIGS. 10A and 10B show a flowchart of a routine by which an image area containing the in-focus subject is extracted and a white balance adjustment is performed based on an image signal corresponding to the image area. The routine is executed in the system controller 31 and is described with reference to FIGS. 1, 3, 10A and 10B.

In Step 101, it is determined whether the photometry switch provided in the operation switch 54 is turned ON. When the photometry switch is turned ON, Step 102 is executed in which an exposure calculation is carried out based on a photometry value obtained by the photometry sensor 52. Namely, an aperture value and a shutter speed are obtained.

In Step 103, the lens groups 14 and 15 are moved along the optical axis, so that an automatic focusing (AF) operation is performed. The focusing condition is sensed by the AF sensor 51, and each of the lens groups 14 and 15 is set to a position where an in-focus condition is obtained, by an operation of the lens control circuit 17. The AF operation is carried out in such a manner that a subject positioned at the center, for example, of an image obtained through the lens groups 14 and 15 is in-focus. In Step 104, a rotational position of the focusing ring 61, i.e. a distance from the electronic still camera to the in-focus subject is obtained based on a relative position of the photo sensor 64 to the two-dimensional bar code 63. A distance signal obtained through the photo sensor 64, i.e. in-focus distance data is stored in a memory (not shown) provided in the system controller 31.

In Step 105, it is determined whether the release switch provided in the operation switch 54 is turned ON. When the release switch is turned OFF, the process goes back to Step 101, so that the operations described above are again executed. Conversely, when the release switch is turned ON, Step 106 and the following Steps are executed.

In Step 106, an exposure operation is started. Namely, the quick return mirror 21 is rotated or set to a horizontal state, the opening degree of the aperture 16 is controlled to an amount corresponding to an aperture value set in Step 102, and the shutter 25 opens. In Step 107, it is determined whether an exposure period, which corresponds to a shutter speed obtained by the exposure calculation of Step 102, has elapsed. When the exposure period has elapsed, the process goes to Step 108, so that the exposure operation is stopped. Namely, the shutter 25 is closed, the quick return mirror 21 is set to an inclined state, and the aperture 16 is fully opened.

In Step 109, an image signal, generated in the CCD 33 due to the exposure operation of Steps 106 through 108, is read. The image signal is converted to digital image data by the A/D convertor 38, and is then subjected to a predetermined process by the image signal processing circuit 39. The digital image data is stored in a first area of the memory 40. In Step 110, it is determined whether the reading operation of the image signal from the CCD 33 has been completed. When the reading operation has not been completed, Step 109 is repeatedly executed. Conversely, when the image signal corresponding to one frame image has been read from the CCD 33 and has been stored in the memory 40, the process goes from Step 110 to Step 111, so that an operation is carried out to sense three-dimensional image data indicating a distance from the electronic still camera to each point on the surface of the subject.

In Step 111, the exposure operation is again started. Namely, the quick return mirror 21 is again set to the horizontal state, and the opening degree of the aperture 16 is set to an amount for performing a sensing operation of the three-dimensional image data. Further, the shutter 25 opens. In Step 112, an electric power is supplied to the projection unit 53. In Step 113, controls of the projection unit 53 and the CCD 33 are started to perform a sensing operation of three-dimensional image data. Namely, a pulse of a distance measuring light beam is output by the projection unit 53, a reflected light beam from the subject is received by the CCD 33, and a signal charge generated due to the reflected light beam is integrated in the CCD 33.

In Step 114, it is determined whether the sensing operation of the three-dimensional image data has been completed, i.e. whether the three-dimensional image data has been read from the CCD 33 and has been stored in a second area of the memory 40. When the storing operation of the three-dimensional image data has not been completed, Step 113 is repeatedly executed. When the storing operation of the three-dimensional image data has been completed, the process goes to Step 115, in which the exposure operation is stopped. Namely, the shutter 25 is closed, the quick return mirror 21 is set to an inclined state, and the aperture 16 is fully opened. Then, Step 116 is executed in which the projection unit 53 is extinguished.

In Step 117, based on the in-focus distance data obtained in Step 104 and the three-dimensional image data obtained in Step 113, one image area is extracted from the one frame image. For example, by selecting pixels, corresponding to points within a predetermined range from a distance indicated by the in-focus distance data which is deemed as the center, from the image data stored in the memory 40 in Step 109, the image area formed by the selected pixels is obtained. The image area corresponds to an image which contains subjects located at approximately the same distance as the subject P1, when only the subject P1 is in-focus in the example shown in FIG. 4.

In Step 118, a part in which a value of color differential data, obtained based on the image data contained in the image area extracted in Step 117, is within a predetermined range, i.e., an achromatic image is extracted. In Step 119, an average value of color differential data corresponding only to the achromatic image obtained in Step 118 is obtained, and is stored in the memory 40 as a control amount for a white balance adjustment. In Step 120, using the control amount obtained in Step 119, the white balance adjustment is applied to the image data which is stored in the memory 40 in Step 109. Since the white balance adjustment is well known, an explanation thereof is omitted.

As described above, in the first embodiment, only an image area is extracted which is formed by image data corresponding to a subject located at approximately the same distance as the in-focus subject. Then, an achromatic image is extracted from the image of the extracted image area, and the control amount of the white balance adjustment is calculated based on only the achromatic image. Therefore, the white balance adjustment is always performed with regard to the in-focus subject, so that an appropriate color expression can be always obtained for the subject.

Figure 11B:
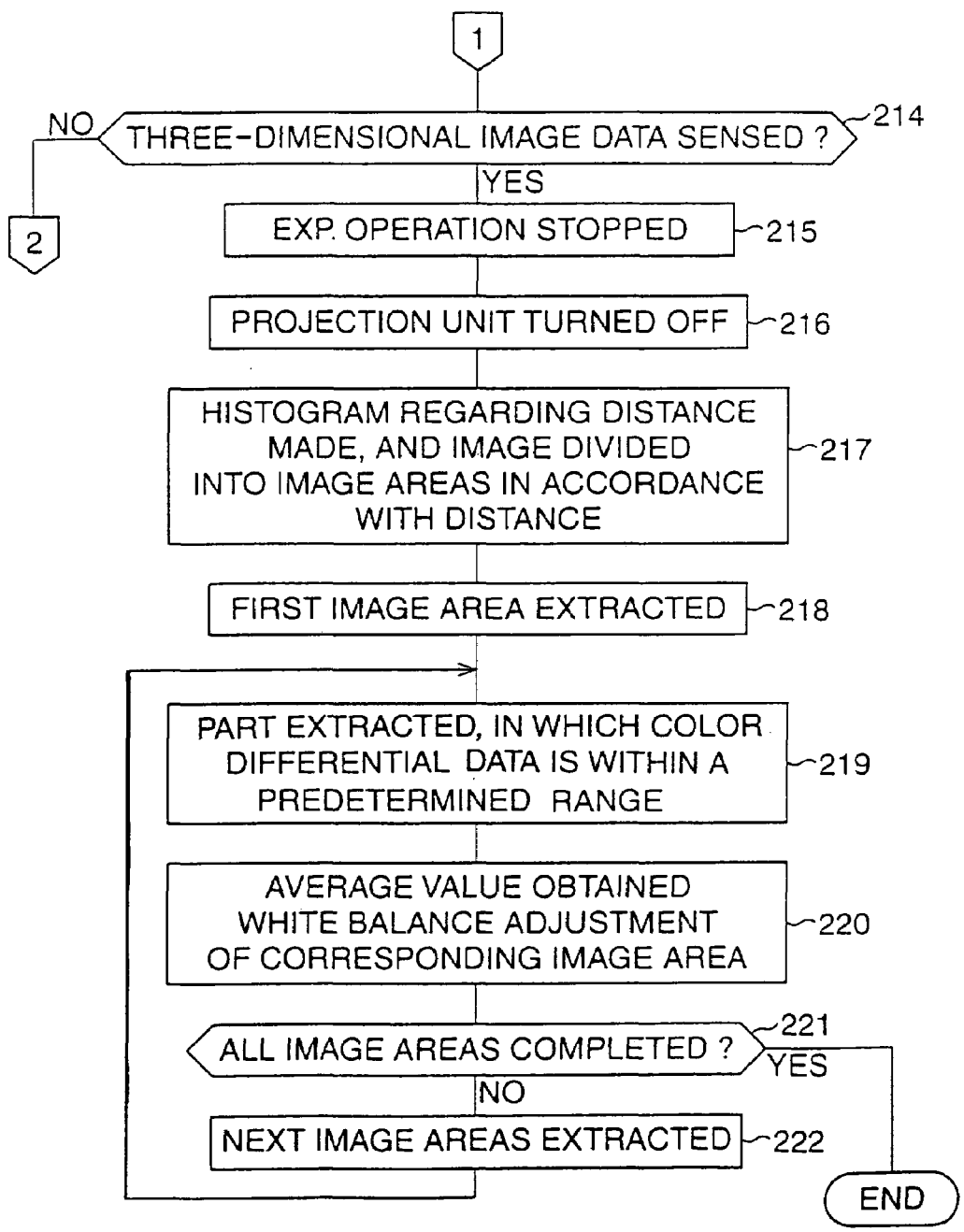

FIGS. 11A and 11B show a flowchart of a white balance adjustment routine of a second embodiment. The other constructions are the same as the first embodiment.

When it is confirmed in Step 201 that the photometry switch is turned ON, Step 202 is executed in which an exposure calculation is carried out based on a photometry value obtained by the photometry sensor 52, so that an aperture value and a shutter speed are obtained. In Step 203, the lens groups 14 and 15 are moved along the optical axis, so that an AF operation is performed so that the lens groups 14 and 15 are set to predetermined positions. In Step 205, it is determined whether the release switch is turned ON. When the release switch is turned OFF, the process goes back to Step 201, and when the release switch is turned ON, Steps 206 and the following Steps are executed.

Operations of Steps 206 through 216 are identical to those of Steps 106 through 116.

In Step 217, based on the three-dimensional image data obtained in Step 213, a single image, corresponding to image data obtained in Step 209, is divided into three image areas, for example. Namely, as shown in FIG. 4, for example, a single image P0 is divided into a first image area P10 composed of a subject P1 of a short distance, a second image area P20 composed of a subject P2 of a long distance, and a third image area P30 composed of a subject P3 of an intermediate distance. Note that, although, in FIG. 4, outlines of the image areas P10, P20 and P30 are shown as rectangular similarly to the original image P0, actually, each of the image areas P10, P20 and P30 is divided by clear boundary lines, which are usually not rectangular. The division of the image areas will be described later.

In Step 218, image data of the first image area P10 is extracted. In Step 219, a part in which a value of color differential data, obtained based on the image data contained in the image area extracted in Step 218, is within a predetermined range, i.e., an achromatic image is extracted. In Step 220, an average value of color differential data corresponding only to the achromatic image obtained in Step 219 is obtained, and a white balance adjustment of the corresponding image area is performed using the average value as a correction amount of the white balance adjustment.

In Step 221, it is determined whether the white balance adjustment has been completed for all of the first, second and third image areas. When the white balance adjustment has not been completed for all of the image areas, Step 222 is executed, in which image data of the next image area is extracted. Then, Steps 219 and 220 are again executed, and the white balance adjustment is carried out for the image area. When it is determined in Step 221 that the white balance adjustment has been completed, the white balance adjustment routine ends.

Figure 12:
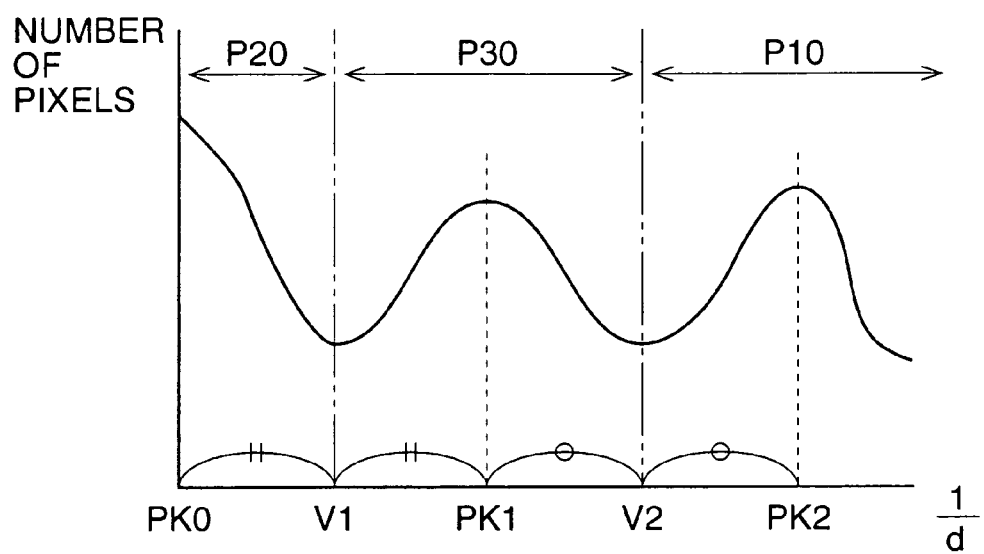
FIG. 12 is a histogram, in which a reciprocal number of a distance "d" from the electronic still camera to the subject is defined as the axis of abscissas and a number of pixels corresponding to the distance is defined as the axis of ordinates.

With reference to FIG. 12, the division of the image areas executed in Step 217 of FIG. 11B is described. FIG. 12 is a histogram, in which a reciprocal number of a distance "d" from the electronic still camera to the subject is defined as the abscissa and a number of pixels corresponding to the distance is defined as the ordinate.

A histogram of distance information is made regarding all of the pixels forming the three-dimensional image data obtained in Step 213. Since pixels of infinity are contained in the photographed image, if a distance is defined as the abscissa of the histogram, the abscissa of the histogram would be extended to infinity. Further, the minimum distance at which a photographing operation can be performed, is finite. Therefore, a reciprocal number of the distance "d" is defined as the abscissa, and the maximum value of the abscissa is set to a finite value.

As shown in FIG. 4, when three subjects P1, P2 and P3, in which distances from the electronic still camera are different, are included in a single image, three peaks including infinity, i.e. a point of 1/d=0 exist in the histogram. Namely, the subject P2 is located at infinity, and the second image area P20 containing the subject P2 corresponds to the left peak PK0 of the histogram. The subject P3 is located at an intermediate distance, and the third image area P30 containing the subject P3 corresponds to the center peak PK1 of the histogram. The subject P1 is located at a short distance, and the first image area P10 containing the subject P1 corresponds to the right peak PK2 of the histogram.

A minimal point, which is positioned at the equal distance from the adjacent peaks PK0 and PK1, is defined as a first boundary V1, and a minimal point, which is positioned at the equal distance from the adjacent peaks PK1 and PK2, is defined as a second boundary V2. In FIG. 4, the second image area P20 corresponds to a histogram positioned at a left side of the first boundary V1, and the third image area P30 corresponds to a histogram positioned between the first and second boundaries V1 and V2. The first image area P10 corresponds to a histogram positioned at a right side of the second boundary V2.

As described above, in the second embodiment, a single image is divided into a plurality of image areas in accordance with a distance from the electronic still camera to the subjects, and for each of the image areas, a white balance adjustment is performed using image data of an achromatic part of the image area. Therefore, the white balance adjustment is properly performed for the image as a whole.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 11-201136 (filed on Jul. 15, 1999) which is expressly incorporated herein, by reference, in its entirety.

What is claimed is:

1. A device that calculates a white balance control amount for an electronic still camera, comprising:
an image signal generator that generates an image signal corresponding to a first image formed on a light receiving surface of an imaging device;
an image area extractor that extracts at least one image area from said first image, which contains a second image of a subject positioned at a predetermined distance from said electronic still camera, said second image being in-focus; and
a control amount calculator that calculates a control amount for performing a white balance adjustment, based on an image signal relating to a single image area contained in said at least one image area, wherein said image area extractor comprises a three dimensional image data sensing processor that senses three dimensional data indicating a distance from said electronic still camera to each point on a surface of said subject to obtain said second image, and said single image area is formed by selecting pixels from said first image corresponding to points within a predetermined range from said predetermined distance.

2. The device of claim 1, wherein said image area extractor extracts said single image area, and said control amount calculator calculates said control amount, based on said image signal relating to said single image area which is extracted by said image area extractor.

3. The device of claim 1, wherein said control amount calculator extracts a third image composed of an achromatic color from said second image of said image area extracted by said image area extractor, and calculates said control amount based on only said third image.

4. The device of claim 1, wherein said three dimensional image data sensing processor comprises a light source radiating a distance measuring light beam onto said subject, and a three dimensional image signal generator that generates three dimensional data indicating a distance from said electronic still camera to each point on a surface of said subject.

5. The device of claim 4, wherein said three dimensional image signal generator comprises said image signal generator.

6. The device of claim 4, wherein said three dimensional image signal generator comprises:
a plurality of photoelectric conversion elements that receive a reflected light beam from said subject, so that a signal charge corresponding to an amount of said received reflected light beam is accumulated in each of said photoelectric conversion elements;
a signal charge holder disposed adjacent to each of said photoelectric conversion elements;
an electric charge discharger that discharges an unwanted charge accumulated in each of said photoelectric conversion elements, so that said accumulation of said signal charge is started in each of said photoelectric conversion elements;
a signal charge transferor that transfers said accumulated signal charge in said photoelectric conversion elements to said signal charge holder; and
a signal charge integrator that alternately drives said electric charge discharger and said signal charge transferor, so that said signal charge is integrated in said signal charge holder.

7. A device that calculates a white balance control amount for an electronic still camera which photographs an image containing at least one subject and at least one portion other than said at least one subject, said white balance control amount calculating device comprising:
an imager by which an image signal corresponding to said image is generated;
an image area extractor that extracts at least one image area from said image, each image area containing one of said at least one subject positioned at a predetermined distance from said electronic still camera, said subject being in-focus; and
a control amount calculator that calculates a control amount for performing a white balance adjustment, based on said image signal relating to a single image area contained in said at least one image area, wherein said image area extractor comprises a three dimensional image data sensing processor that senses three dimensional data indicating a distance from said electronic still camera to each point on a surface of said subject to obtain said at least one image area, and said single image area is formed by selecting pixels from said image corresponding to points within a predetermined range from said predetermined distance.

* * * * *